No. 737,512. PATENTED AUG. 25, 1903.
J. T. SMITH.
MACHINE FOR THRESHING FLAX OR HEMP.
APPLICATION FILED FEB. 11, 1902.
NO MODEL. 2 SHEETS—SHEET 1.
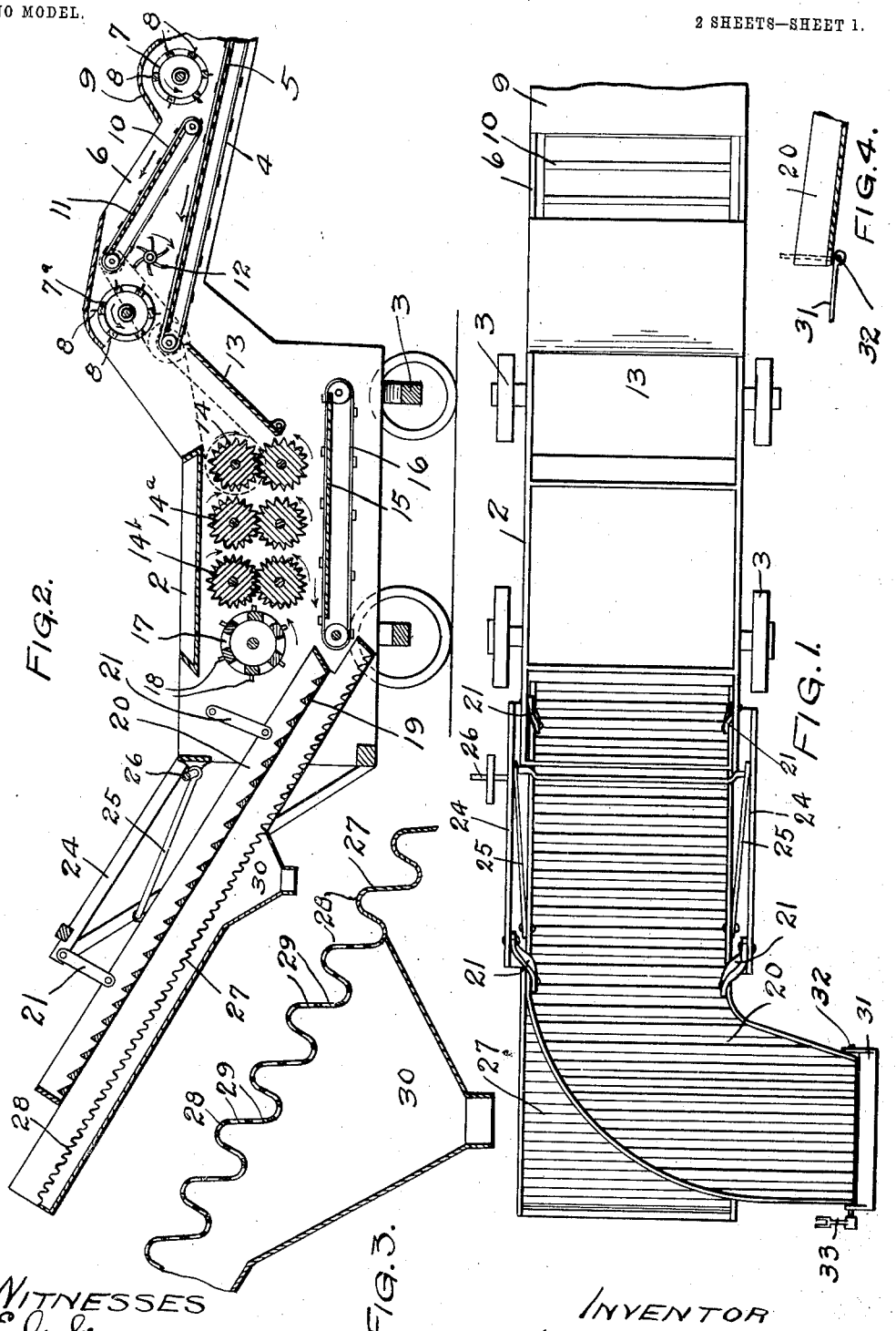
WITNESSES
INVENTOR
JOHN T. SMITH
BY HIS ATTORNEYS

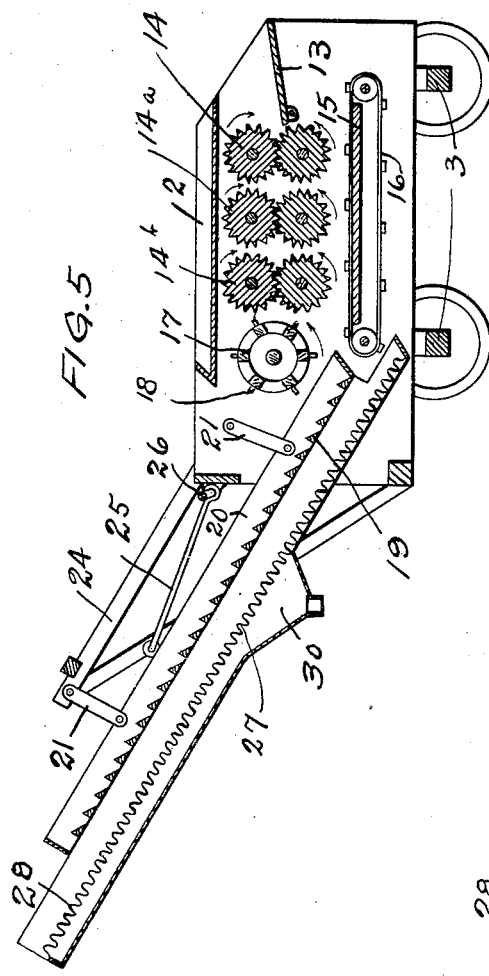
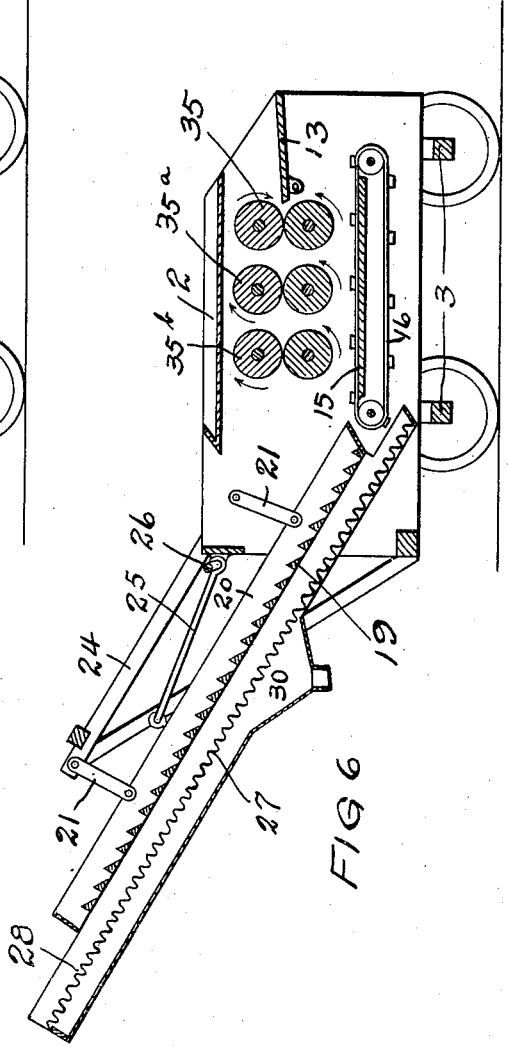

No. 737,512. Patented August 25, 1903.

UNITED STATES PATENT OFFICE.

JOHN T. SMITH, OF HERON LAKE, MINNESOTA.

MACHINE FOR THRESHING FLAX OR HEMP.

SPECIFICATION forming part of Letters Patent No. 737,512, dated August 25, 1903.

Application filed February 11, 1902. Serial No. 93,643. (No model.)

*To all whom it may concern:*

Be it known that I, JOHN T. SMITH, of Heron Lake, Jackson county, Minnesota, have invented certain new and useful Improvements in Machines for Threshing Flax or Hemp, of which the following is a specification.

The object of this invention is to provide a machine wherein grain, particularly flax and hemp, may be threshed and the seeds cleaned and separated from the chaff and other refuse material.

A further object is to provide a machine wherein flax or hemp straw may be treated after being threshed and the seed-bolls broken and the seeds and the woody portions of the fiber loosened and separated and the seeds finally delivered to a cleaner mechanism.

A further object is to provide an apparatus for treating flax or hemp straw in which the straw is spread or thinned and fed in a continuous stream to the crushing mechanism.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of an apparatus embodying my invention. Fig. 2 is a longitudinal section. Fig. 3 is a detail of a portion of a shaker at one end of the machine. Fig. 4 is a detail of the gate provided at the upper end of the slatted shaker. Fig. 5 is a longitudinal section of the machine without the spreading and thinning attachment and showing the adjustable feed-board. Fig. 6 is a similar view showing smooth rolls in place of the corrugated ones.

In the drawings, 2 represents a suitable casing mounted upon a wheeled frame 3 and wherein the threshing mechanism is arranged.

4 is a long slatted carrier-belt operating over a floor 5 within a casing 6. This carrier extends for a considerable distance in front of the machine and is adapted to receive the grain directly from the load, which may be placed on either side of the carrier. Above the carrier 4 is a revolving picker 7, provided with a series of teeth 8, that are adapted to catch up the straw and whirl it up beneath a hood or arch 9 and throw the same upon a shorter carrier 10, that operates over a floor 11. The carrier 10 is inclined upwardly from its outer toward its inner end and is adapted to travel faster than the carrier 4, and consequently causes a spreading or thinning of the stream of grain that is thrown thereon. The lower end of the carrier 10 is a sufficient distance above the carrier 4 to permit the short straw and chaff to be carried along by said carrier 4, and beneath the upper end of the carrier 10 I arrange a picker-wheel 12, that moves slowly and is adapted to retard the straw that is brought along by the carrier 4. The straw carried up by the carrier 10 is delivered to a second revolving picker $7^a$ and is tossed up and separated thereby, and said picker $7^a$ also gathers up the short straw that is tossed up and separated by the picker 12. This spreading and thinning apparatus is substantially the same as the one described in a companion application executed December 12, 1901, and I make no claim to the same in this case except in combination with other parts of this apparatus.

Beneath the discharge end of the carrier 4 is a hinged feed-board 13, that is adapted to receive the straw or grain from said carrier and deliver it to corrugated crushing-rolls 14, $14^a$, and $14^b$. These rolls are adapted to crush the straw and the seed-bolls and loosen and separate the seeds therefrom and also break up the woody portions of the fiber. They may be employed to thresh out the flax or hemp, and they are equally adapted to treat flax or hemp that has been threshed. I have shown three sets of these crushing-rolls; but a greater or less number may be employed, if preferred. Beneath the rolls is a floor 15, over which a slatted belt 16 operates to receive the loose seeds and chaff from the rolls and deliver it to a reciprocating shaker. Above the discharge end of said carrier-belt and near said crushers is a revolving beater 17, provided with a series of teeth 18. This beater receives the straw from the crushers and throws the same upon a slatted floor 19, that is provided in an upwardly-inclined shaker 20, supported upon links 21 in the casing 2 and on a frame 24 at the end of the machine. The shaker is reciprocated by means of a pitman 25, provided on a crank-shaft 26. The upper end of the slatted floor is laterally turned, as shown, to discharge the straw at the side of the machine. Beneath the slatted floor is a seed plate or pan 27, on the lower end of which the seeds and chaff are delivered by the belt 16. This plate is preferably of sheet metal and provided with a series of ribs 28, which as the shoe is reciprocated causes the chaff and seeds to slowly ascend the plate toward the upper end thereof. Beginning at a point near the middle of said plate the ribs 28 are provided with a series of holes or slots 29, through which the seeds fall into a hopper 30, that is located above a suitable fanning-mill, (not shown,) where the seeds are finally cleaned of all fine chaff that has passed through the holes in the ribs. The seeds and chaff that are mixed with the straw and fall upon the slatted floor 19 will by the action of the shaker be separated and, falling through upon the plate 27, will gradually work up to the holes therein and fall into the hopper. The coarser refuse material that is too large to pass through the holes in the plate will gradually ascend to the upper end thereof and be discharged upon the ground or into a suitable receptacle. In this way I am able first to feed the threshed or unthreshed straw in a thin continuous stream to the crushing-rolls, then thoroughly thresh out the seeds, break up the woody portions of the fiber, the seeds falling upon the slatted conveyer while the straw is delivered to the upper portion of the shaker. The seeds after being collected by the carrier-belt are delivered to the seed-plate in the lower part of the shaker, where they are separated from the chaff before passing to the fanning-mill. The seed-plate also receives the seeds and fine refuse material that is shaken out of the straw by the action of the slatted floor, and these seeds mingle with those that fall upon the slatted carrier and are thoroughly cleaned of the coarse chaff as they pass through the perforated plate.

In practice I arrange a baling-press beneath the laterally-turned upper end of the slatted shaker, and to prevent the tow from being discharged from said shaker while a bale is being removed and the follower is being dropped into place I provide a gate 31, mounted on a rod 32, that is provided at one end with a crank 33, that is operatively connected with a lever (not shown) within control of the operator. By throwing this gate up to the position indicated by dotted lines in Fig. 4 the discharge of the tow from the shaker will be prevented until the follower is put in place and the press ready to receive material for another bale.

In Fig. 5 I have shown the machine without the spreading and thinning apparatus and with the hinged feed-board turned down to a substantially horizontal position, where the straw can be conveniently fed to the rolls by hand.

In Fig. 6 I have shown the machine provided with a series of smooth rolls 35, 35ª, and 35ᵇ. These rolls are removable and can be substituted for the corrugated rolls at any time. I prefer to use these smooth rolls before retting the straw to crush the seed-bolls and loosen the seeds without breaking or shortening the fiber of the straw. When the smooth rolls are employed, I prefer to dispense with the beater, the revolution of which has a tendency to shorten the straw and render it less suitable for retting.

The machines above described are easily transported from place to place in the field to bring them within convenient operating distance to a stack or where a load can be discharged, and the straw can be fed to the machines by power or hand, as preferred.

I claim as my invention—

1. The combination, with a casing and a series of crushing-rolls mounted therein, of seed-gathering means provided beneath said rolls, an open-bottom shaker having its receiving end near the discharge side of said rolls to receive the tow therefrom, a seed-plate or pan provided beneath said shaker and having its receiving end in position to receive the material from said seed-gathering means, said plate being provided with a series of perforations near its discharge end, and a hopper arranged beneath said perforations.

2. The combination, with a suitable casing, and a series of crushing-rolls mounted therein, of seed-gathering means provided beneath said rolls, an open-bottom shaker having its receiving end near the discharge side of said rolls, the discharge end of said shaker being laterally turned, a seed plate or pan provided beneath said shaker and having its receiving end in position to receive the material from said seed-gathering means, and said plate also receiving the seeds and fine material separated from the tow by the movement of said shaker.

3. The combination, with a casing and the crushing-rolls mounted therein, of seed-gathering means provided beneath said rolls, an open-bottom shaker having its receiving end near the discharge side of said rolls, a seed-plate beneath said shaker with its receiving end in position to receive the seeds and fine material from said seed-gathering means, and said seed-plate being provided near its discharge end with a series of perforations.

4. The combination, with a wheeled frame and a casing mounted thereon, of a series of crushing-rolls provided in said casing, a slatted carrier operating beneath said rolls, an open-bottomed shaker whereto the tow is delivered from said rolls, a corrugated seed plate or pan provided beneath said shaker and adapted to receive the seeds and chaff from said carrier, the upper portion of said plate or pan being perforated, and a hopper provided beneath the perforated portion of said plate or pan.

5. The combination, with a wheeled frame and a casing mounted thereon, of a series of crushing-rolls whereto the straw to be treated is delivered, a carrier operating beneath said rolls, a beater near the discharge side of said rolls, a shaker whereon the tow is thrown from said beater, the upper end of said shaker being laterally turned to discharge the tow at the side of the machine, a corrugated seed plate or pan provided beneath said shaker and adapted to receive the seeds and chaff therefrom and from the discharge end of said carrier, the upper portion of said seed-plate having a series of perforations, and a hopper provided beneath said plate whereto the seeds are delivered while the chaff is discharged over the upper end of said plate.

6. The combination, with a wheeled frame and a casing mounted thereon, of crushing-rolls provided in said casing, a carrier operating beneath said rolls to receive the seeds and chaff therefrom, a reciprocating shoe, a corrugated seed-pan provided therein whereto the seeds and chaff are delivered by said carrier, the upper portion of said pan having a series of perforations, a hopper provided beneath said pan to receive the seeds therefrom, and means for receiving the tow from said rolls and separating the loose seeds therefrom and discharging them into said pan.

7. The combination, with the frame and the casing mounted thereon, of a series of crushing-rolls arranged in said casing and whereto the straw to be crushed and broken is delivered, means beneath said rolls for gathering up the seeds separated by the action thereof, a shaker, having an open bottom whereon the tow is deposited from said rolls, a plate provided beneath said shaker and having a series of transverse ribs, the lower end of said plate being beneath the discharge end of said seed-gathering means, the upper portion of said plate being perforated through which the seeds that fall from said shaker and those that are delivered from said seed-gathering means may escape.

8. The combination, with a wheeled frame and a casing mounted thereon, of a series of crushing-rolls provided in said casing and whereto the straw to be crushed is delivered, means provided beneath said rolls for gathering up the loose seeds therefrom, a shaker having a slatted floor whereto the tow is delivered from said rolls, means for reciprocating said shaker, and a plate having a series of ribs in its surface provided beneath said slatted floor and adapted to receive the loose seeds and chaff therefrom and from the discharge end of said seed-gathering means, and said plate being provided with a series of perforations, substantially as described.

9. The combination, with a wheeled frame and a casing mounted thereon, of an adjustable feed-board, a series of rolls provided in said casing and whereto the straw to be treated is delivered from said board, an upwardly-inclined shoe near the discharge side of said rolls, means for reciprocating said shoe, a slatted floor provided in said shoe whereon the straw is deposited from said rolls, the upper end of said floor being laterally turned to deposit the straw at the side of the machine, a ribbed plate provided in said shoe beneath said slatted floor and having a series of perforations, and a suitable hopper provided beneath said plate, substantially as described.

10. The combination, with a suitable casing and the crushing-rolls mounted therein, of seed-gathering means provided beneath said rolls, an upwardly-inclined shoe, a shaker having a slatted bottom arranged therein with its receiving end near the discharge side of said rolls and a laterally-turned discharge end, a transversely-ribbed seed-plate provided in said shoe beneath said shaker and having its receiving end arranged to receive the material from said seed-gathering means and its discharge end projecting beyond said shaker, and said plate being provided with a series of perforations near its upper end, substantially as described and for the purpose specified.

11. The combination, with a series of crushing-rolls, of seed-gathering means provided beneath the same, an open-bottom shaker device near the discharge side of said rolls to receive the tow therefrom, a corrugated plate beneath said shaker and having its receiving end in position to receive the seeds from said seed-gathering means, and said plate being provided with a series of perforations.

In witness whereof I have hereunto set my hand this 18th day of January, 1902.

JOHN T. SMITH.

In presence of—
RICHARD PAUL,
M. C. NOONAN.